(12) United States Patent
Webster et al.

(10) Patent No.: US 9,598,242 B2
(45) Date of Patent: Mar. 21, 2017

(54) MOVING FLOOR SYSTEM

(71) Applicants: Mark Webster, Hubertus, WI (US); David Konopacki, Saskatchewan (CA); Michael Reilly, Mukwonago, WI (US)

(72) Inventors: Mark Webster, Hubertus, WI (US); David Konopacki, Saskatchewan (CA); Michael Reilly, Mukwonago, WI (US)

( * ) Notice: Subject to any disclaimer, the term of this patent is extended or adjusted under 35 U.S.C. 154(b) by 0 days.

(21) Appl. No.: 14/606,312

(22) Filed: Jan. 27, 2015

(65) Prior Publication Data

US 2015/0217945 A1    Aug. 6, 2015

Related U.S. Application Data

(60) Provisional application No. 61/935,124, filed on Feb. 3, 2014.

(51) Int. Cl.
*B65G 35/06* (2006.01)
*B65G 37/02* (2006.01)

(52) U.S. Cl.
CPC ............. *B65G 37/02* (2013.01); *B65G 35/06* (2013.01)

(58) Field of Classification Search
CPC .................................................. B65G 35/08
USPC ................. 198/322, 326, 330, 334, 735.2
See application file for complete search history.

(56) References Cited

U.S. PATENT DOCUMENTS

| | | | | |
|---|---|---|---|---|
| 3,662,906 A * | 5/1972 | Christensen | ............ | B61B 1/005 104/172.2 |
| 3,918,367 A * | 11/1975 | Alimanestianu | .......... | B61B 1/02 104/127 |
| 4,284,191 A * | 8/1981 | Lavau | .................... | B66B 21/12 198/334 |
| 4,330,057 A * | 5/1982 | Binns | ..................... | B66B 23/10 198/334 |
| 4,987,834 A * | 1/1991 | Peck, Jr. | ............... | B23Q 7/1436 104/128 |
| 5,076,172 A * | 12/1991 | Grimm | ................ | B65G 35/063 104/166 |
| 6,234,285 B1 * | 5/2001 | Friedrich | ................ | B60T 1/087 188/290 |
| 6,348,025 B1 * | 2/2002 | Schonenberger | ...... | A63B 22/02 198/334 |
| 6,454,079 B1 * | 9/2002 | Teramoto | ............... | B65G 23/30 198/334 |

(Continued)

OTHER PUBLICATIONS

US PG Pub 2004/0035674 A1, Inoue, Feb. 26, 2004.*
US PG Pub 2012/0168277 A1, Senger et al., Jul. 5, 2012.*

*Primary Examiner* — Douglas Hess
(74) *Attorney, Agent, or Firm* — Andrus Intellectual Property Law, LLP (57) ABSTRACT

A moving floor system that includes a moving work surface to move work products from an upstream end to a downstream end. The moving work surface is formed from a plurality of individual carts joined to each other. The stack of carts is moved along upper support rails located at an upper level. When each individual cart reaches the downstream end, a downstream lift conveyor moves the individual cart from the upper level to a lower level. When at the lower level, each individual cart is returned from the downstream end to the upstream end. When each individual cart reaches the upstream end, an upstream lift conveyor returns the individual carts from the lower level to the upper level. An upper drive mechanism provides the motive force to move the stack of carts along the upper level at the working speed.

15 Claims, 11 Drawing Sheets

(56) References Cited

U.S. PATENT DOCUMENTS

| | | | | |
|---|---|---|---|---|
| 6,640,958 B2* | 11/2003 | Postlmayr | ............... | B66B 21/02 104/288 |
| 6,675,949 B1* | 1/2004 | Gonzalez Alemany | ............... | B66B 21/12 198/334 |
| 6,832,678 B2* | 12/2004 | Ogura | ................... | B66B 21/025 198/322 |
| 7,353,932 B2* | 4/2008 | Aulanko | ................. | B66B 21/00 198/321 |
| 7,628,268 B2* | 12/2009 | Mueller | ................. | B65G 37/02 198/465.1 |
| 8,522,951 B2* | 9/2013 | Gonzalez Alemany | ............................... | B66B 23/12 198/330 |
| 9,067,408 B2* | 6/2015 | Veis | ......................... | B41J 11/06 |

* cited by examiner

MOVING FLOOR SYSTEM

CROSS-REFERENCE TO RELATED APPLICATION

The present application is based on and claims priority to U.S. Provisional Patent Application Ser. No. 61/935,124 filed Feb. 3, 2014, the disclosure of which is incorporated herein by reference.

BACKGROUND

The present disclosure relates to a moving floor conveying system for moving large products from a first end of an assembly line to a second end of the assembly line. The moving floor conveying system supports and moves the products along the assembly line such that various steps of assembly can be performed while the product is moving along with the moving work surface.

Presently, when large products, such as farm implements, trucks or airplanes, are assembled, the product is typically moved along an assembly line where different stages of the assembly take place. In such situations, the large product is moved along the assembly line and various different assembly line workers work on the product during this movement. During this assembly, the assembly line workers must move along with the product, which results in movement of tools and various other equipment needed during the assembly process. This type of assembly line process, while efficient, requires that the assembly line workers move to keep up with the moving product.

SUMMARY OF THE INVENTION

The moving floor system of the present disclosure is created within a pit formed in the floor of a factory or plant. The moving floor system includes the moving work surface at an upper, first level and a return conveyor system located at a lower, second level. The lower, second level is positioned directly beneath the upper level including the work surface to minimize the footprint of the moving floor system.

The moving work surface is formed by a plurality of individual carts that are positioned in an adjacent edge-to-edge orientation such that the top surfaces of the adjacent carts create the generally continuous moving work surface. Each of the carts is supported along spaced upper support rails. Each of the carts includes a series of wheels such that the carts can be pushed along the length of the upper support rails.

The moving floor system includes a vertical lift conveyor at the downstream end of the moving floor system and a vertical lift conveyor positioned at the upstream end of the moving floor system. When one of the carts reaches the downstream end, the cart is pushed from the stack of carts onto a carriage of the downstream lift conveyor. Once the cart is received by the carriage of the downstream lift conveyor, the carriage is lowered to the lower level.

Once the carriage of the downstream lift conveyor reaches the lower level, a drive mechanism of the downstream lift conveyor pushes the cart onto lower support rails and into engagement with a return drive mechanism. The speed of the return drive mechanism is greater than the speed of the carts along the upper support rails when the carts define the moving work surface. In this manner, only a few carts (four) need to be received by the lower support rails at the lower level. The return drive mechanism moves the carts back to the upstream end of the moving floor system for return to the stack after another cart is discharged from the downstream end of the moving work surface. The lower return drive mechanism indexes a plurality of carts from the downstream end to the upstream end for return to the upper level of the moving floor system.

When each cart reaches the upstream end at the lower level, the cart is pushed onto the carriage of the upstream vertical lift conveyor. Once the cart is received on the carriage, the upstream lift conveyor is actuated to lift the cart from the lower level to the upper level. When at the upper level, the cart is in position to be added to the stack of carts that define the moving upper work surface.

When the moving upper work surface needs another cart to add to the back end of the stack, a pusher mechanism pushes the cart into the stack. Once the cart has been pushed off of the carriage of the upstream lift conveyor, the carriage returns to the lower level to receive another cart from the lower support rails.

The stack of carts is moved along the length of the upper level of the moving floor system by a series of pushers which may be hydraulic cylinders. The pushers act on the stack of carts to create an even speed for the stack of carts along the upper surface of the moving floor system.

As can be understood by the above description, each of the carts cycles from the upper moving work surface to the lower return through the operation of the downstream and upstream lift conveyors. The cycle of movement of each of the carts creates a system that is able to move heavy, large objects over a long, wide work surface.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 14B

DETAILED DESCRIPTION OF THE INVENTION

Figure 1:
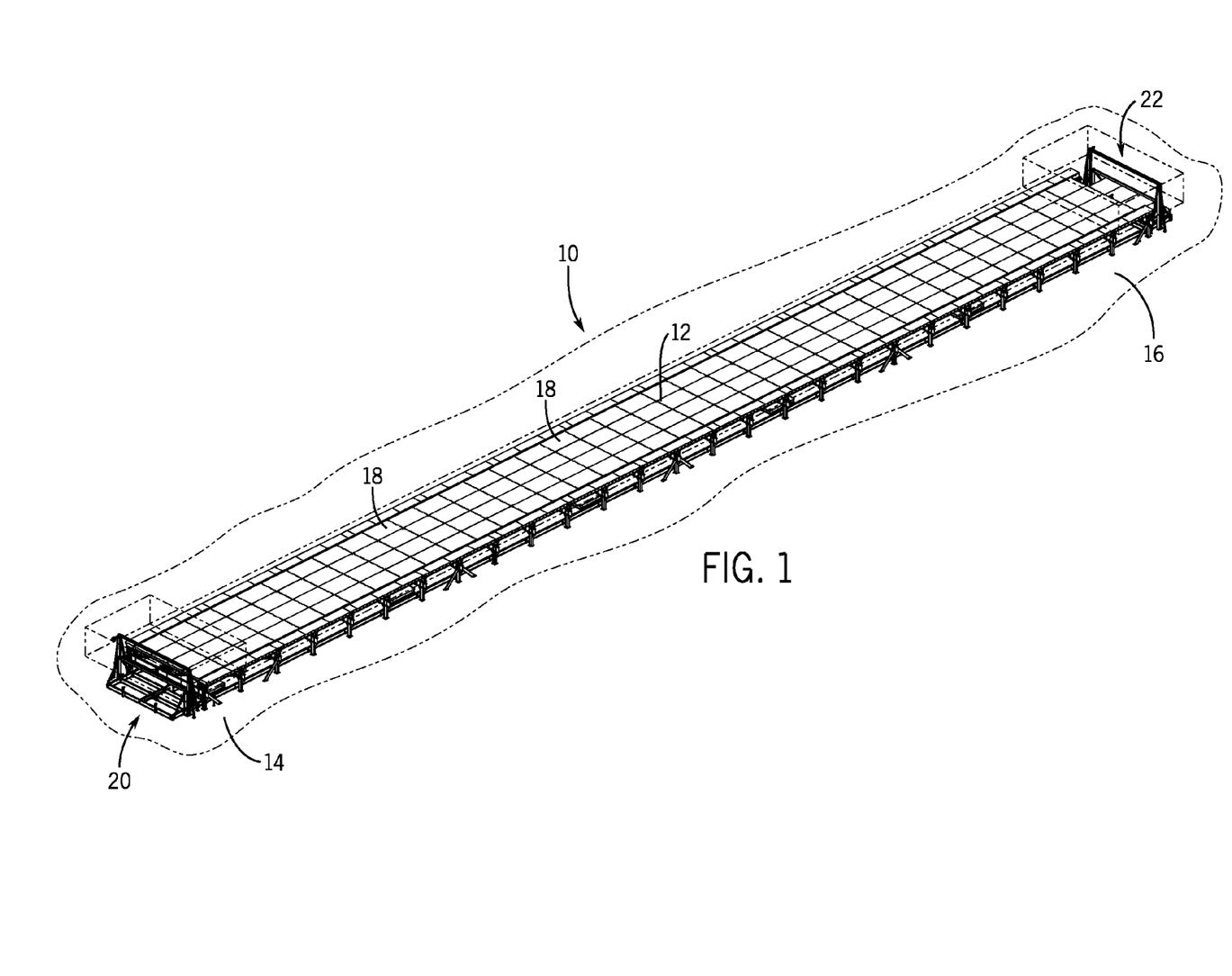
FIG. 1 is a top perspective view of the moving floor conveyor system of the present disclosure.

FIG. 1 illustrates the moving floor system 10 of the present disclosure. The moving floor system 10 shown in FIG. 1 creates a moving work surface 12 that is able to move large products, such as farm implements, trucks or other similar products being assembled along an assembly line from a first, upstream end 14 to a second, downstream end 16. In the embodiment shown in FIG. 1, the moving floor system defines a 350' long by 25' wide work surface 12. The work surface, in the embodiment illustrated, moves at a selected constant velocity of approximately 3.2' fpm or less. As will be described in detail below, the speed of the work surface 12 can be varied depending on the specific application and could be any speed reasonable for the working environment.

The work surface 12 is formed by a series of adjacent carts 18 that are each 25' wide and 10' long and are moved from the upstream end 14 to the downstream end 16 as an assembled stack. At the speed indicated, each of the individual carts takes approximately two hours to move from the upstream end 14 to the downstream end 16 of the moving floor system 10.

Figure 4:
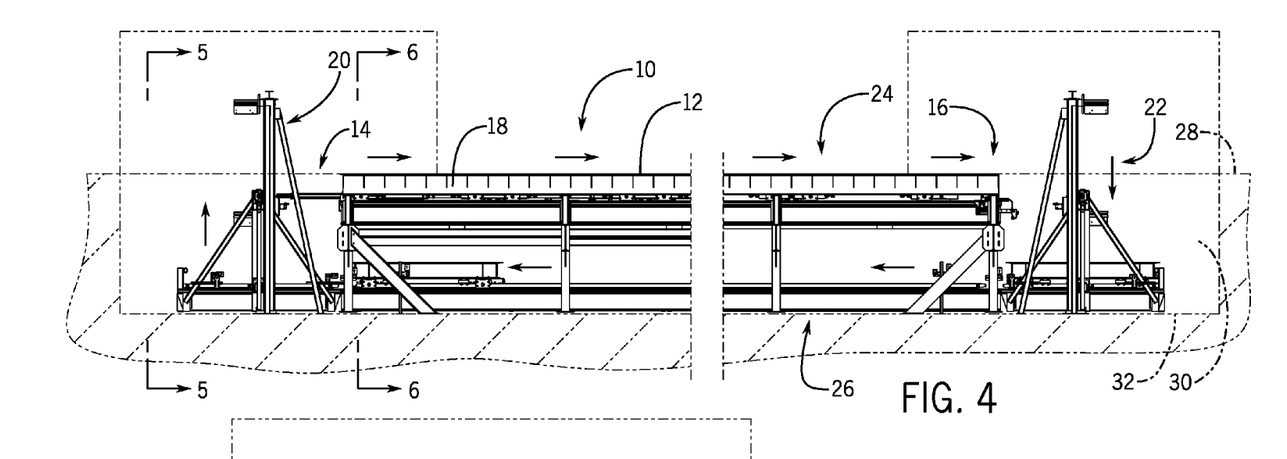
FIG. 4 is side view showing the upper support rails and lower support rails along with the pair of vertical lift conveyors.

The moving floor system includes an upstream vertical lift conveyor 20 and a downstream vertical lift conveyor 22 that are each operable to move individual carts between an upper level 24 and a lower level 26 as schematically indicated in FIG. 4. As illustrated by the arrows shown in FIG. 4, each of the individual carts 18 move in the direction shown by the arrows at the upper level 24 from the upstream end 14 to the downstream end 16. When the individual cart reaches the downstream end 16, the downstream vertical lift conveyor 22 receives the cart and moves the cart to the lower level 26. At the lower level, a conveyor returns the cart to the upstream end where it is received by the upstream vertical lift conveyor 20 and returned to the upper level 24 to be recirculated and to repeat the process.

As illustrated in FIG. 4, the work surface 12 is generally flush with a floor 28 of the facility in which the moving floor system 10 is installed. The operating components of the moving floor system 10 are generally received within a pit 30 that is recessed from the floor and includes a pit floor 32. In the embodiment shown, the pit 30 is 396' (length) by 32' (width) by 9' (depth). However, it is understood that different sizes of the pit and different lengths of the moving floor system could be utilized while operating within the scope of the present disclosure.

Figure 2:
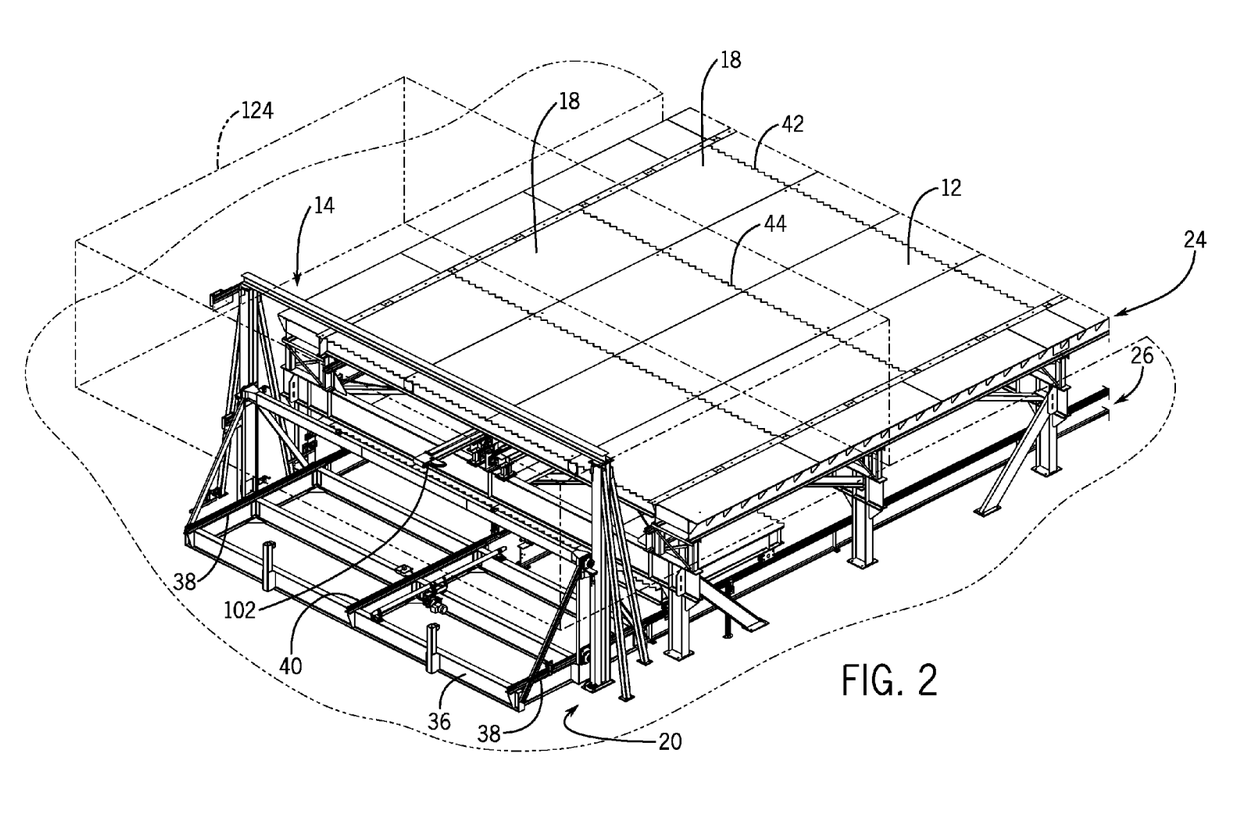
FIG. 2 is a magnified top perspective view of the vertical lift conveyor at the upstream end of the moving floor conveyor system.
Figure 3:
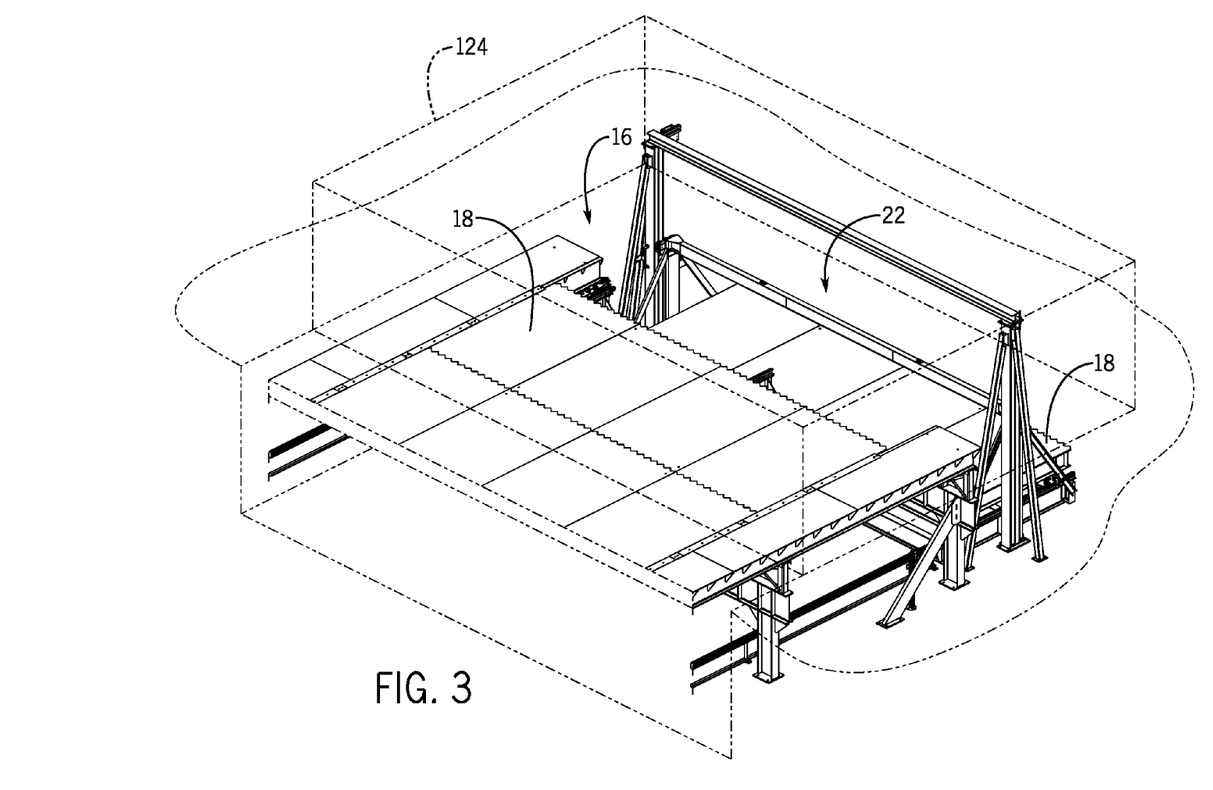
FIG. 3 is a magnified top perspective view of the vertical lift conveyor at the downstream end of the moving floor conveyor system.

Referring now to FIGS. 2 and 3, details of the upstream vertical lift conveyor 20 and the downstream vertical lift conveyor 22 are shown. In the embodiment illustrated, the upstream lift conveyor 20 and the downstream lift conveyor 22 are identical devices. Each of the vertical lift conveyors 20, 22 includes a pair of hydraulic displacement-type cylinders that perform the lifting and lowering of a carriage 36 between the upper level 24 and the lower level 26. As shown in FIG. 2, the carriage 36 includes a pair of spaced outer support rails 38 and a center support rail 40 that are designed to support one of the carts 18 on the carriage 36. The vertical lift conveyors 20, 22 each incorporate soft start and soft stop utilizing a variable speed motor to raise the carriage 36 and a proportional flow control valve for lowering. This control system enables the downstream lift conveyor 22 to softly set the cart in position for return on the lower level 26 and the upstream vertical lift conveyor 20 to softly pick the cart off of the conveyor. The carriage 36 is positively positioned in both the upper and lower positions by resting on fixed stops in the lower position and by pressing against fixed stops in the upper position.

Figure 7:
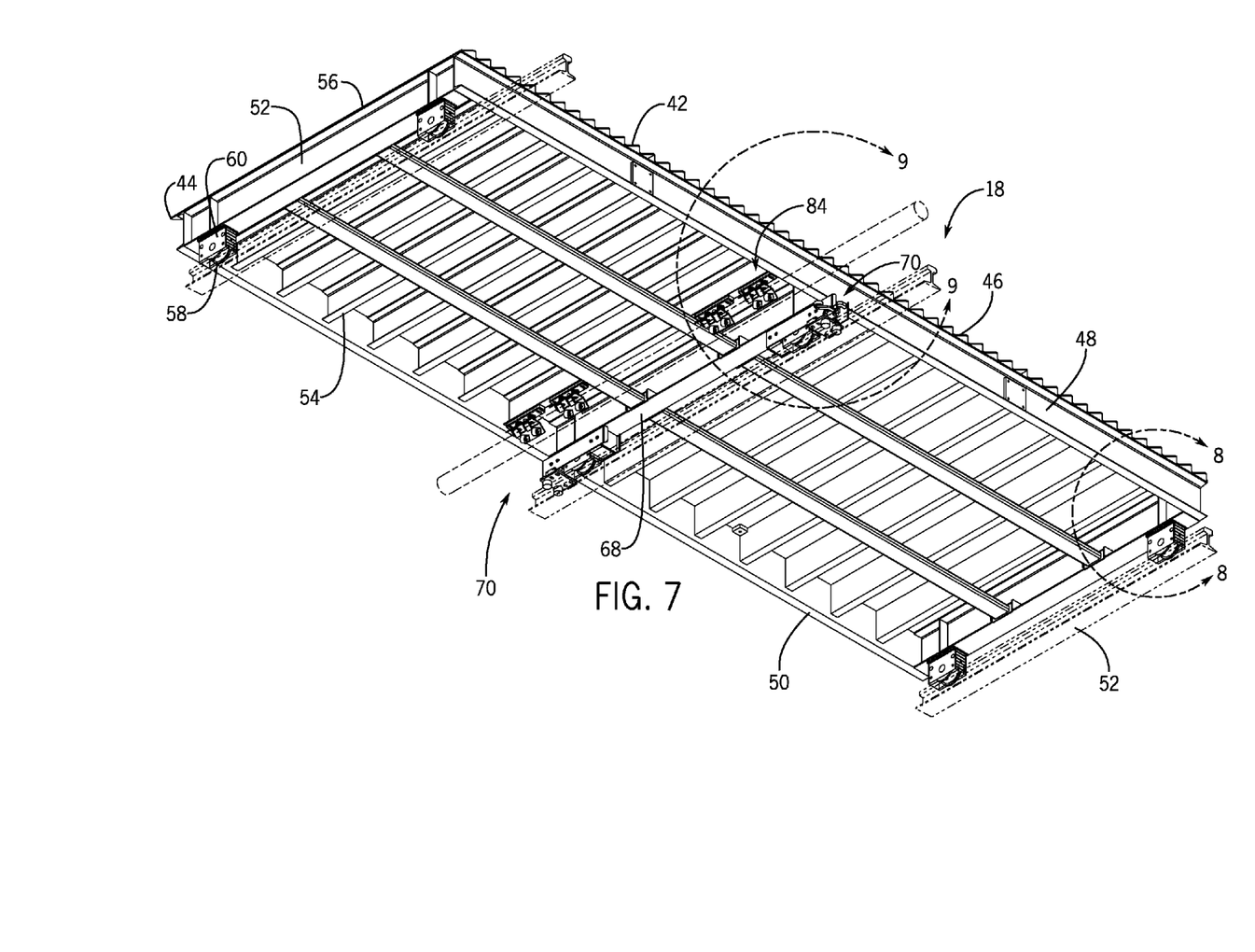
FIG. 7 is a bottom perspective view showing one of the carts.

As illustrated in FIG. 2, each of the individual carts 18 are positioned in an end-to-end orientation to define a continuous stack. Each cart includes a leading edge 42 and a trailing edge 44. As shown in FIG. 7, the leading edge 42 and the trailing edge 44 each includes a series of serrations 46 that allow the leading edge 42 of one cart to mesh and interconnect with the trailing edge 44 of the cart positioned immediately upstream in the assembled stack. In the embodiment illustrated in FIG. 1, there are a total of forty-three carts in the moving floor system 10. Thirty-six of the carts 18 make up the work surface 12. The remaining eight carts include two on the upstream and downstream vertical lift conveyors 20, 22 and four positioned along the length of the lower level and one extra.

As illustrated in FIG. 7, each of the individual carts 18 are formed from welded structural steel. The carts include a front rail 48 and a rear rail 50 that are joined together by a pair of spaced side rails 52. A series of cross supports 54 extend between the front and rear rails 48, 50 to support a section of top decking 56. The top decking 56 defines the serrated leading and trailing edges of each of the individual carts 18.

Figure 8:
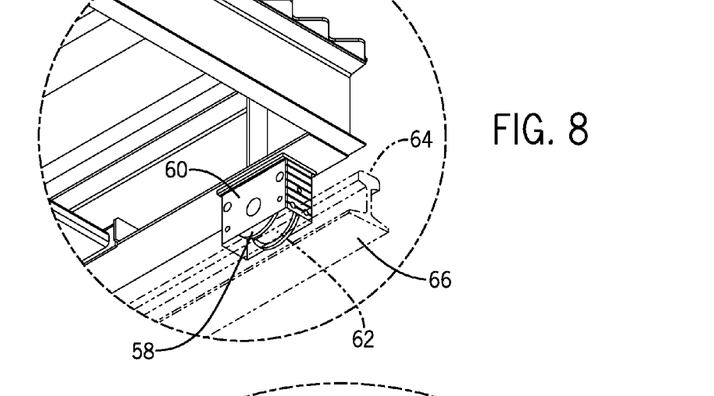
FIG. 8 is a magnified view taken along line 8-8 of FIG. 7.

Each of the side rails 52 includes a pair of support wheels 58 rotatably mounted within a support block 60. As illustrated in the magnified view of FIG. 8, each of the support wheels 58 includes a center locating groove 62 that rides along a top support edge 64 of a support rail 66.

Figure 9:
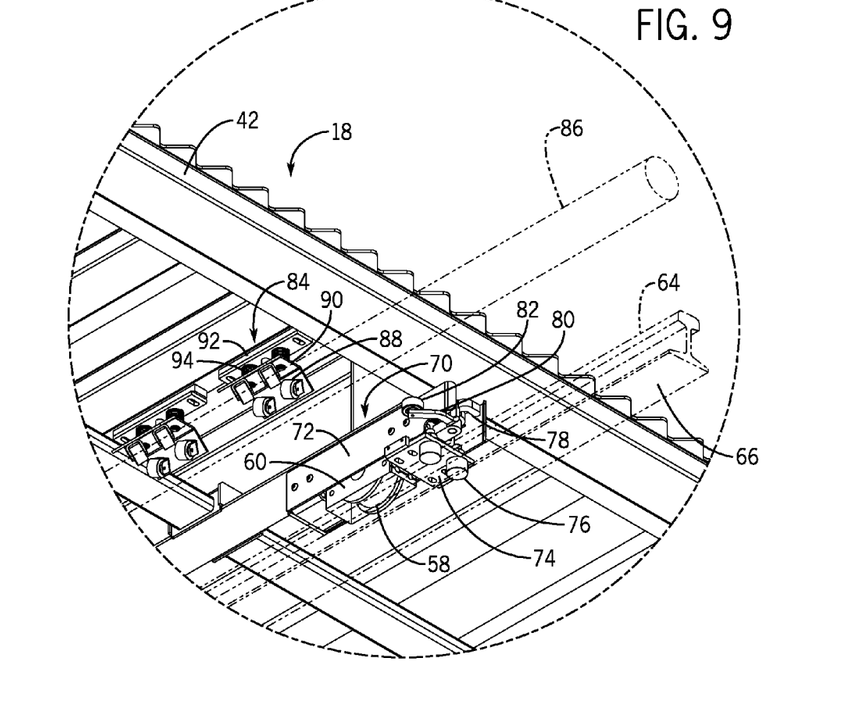
FIG. 9 is a magnified view taken along line 9-9 of FIG. 7.
Figure 10:
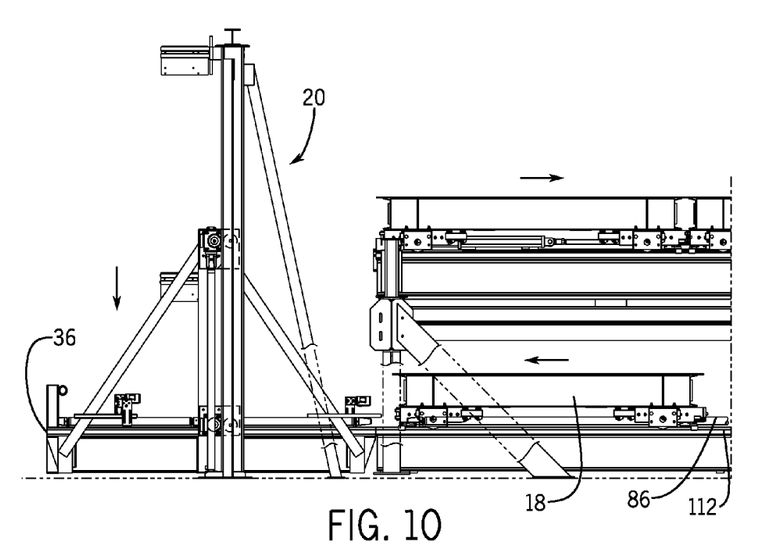
FIG. 10 is a side view showing the uplift conveyor in a position to receive one of the carts.
Figure 11:
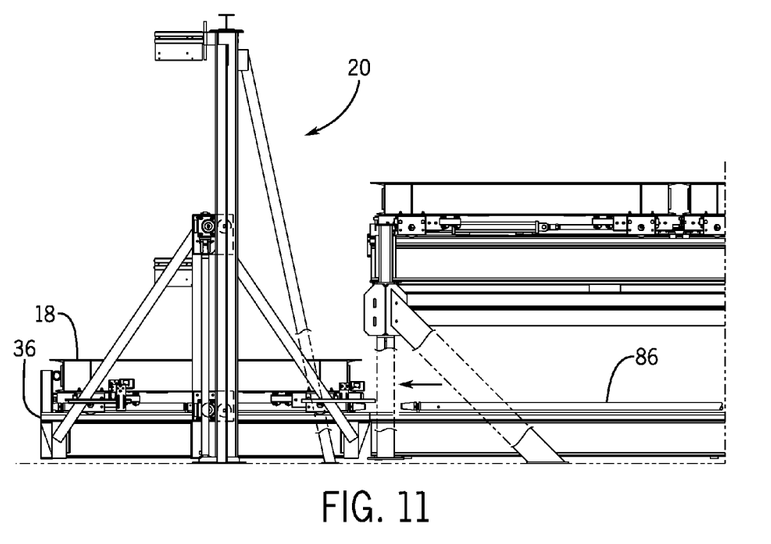
FIG. 11 is a side view showing the receipt of one of the carts on the upstream vertical lift conveyor.

Referring back to FIG. 7, the support cart 18 includes a center rail 68 that provides additional support for the center of the cart to minimize deflection of the cart under load that supports a pair of latching assemblies 70 that are located near both the leading and trailing edges of the cart 18. FIG. 9 illustrates each of the latching assemblies 70. The latching assembly 70 includes a support housing 72 that receives a support block 60 and support wheels 58. The support wheel 58 rides along a similar support edge 64 of the support rail 66.

The latching assembly 70 further includes a guide plate 74 having a pair of guide blocks 76 that align the cart 18 along the support rail 66. The latching assembly 70 includes a latch 78 that extends from the housing 72. The latch 78 located at the leading edge 42 of the cart 18 is designed to receive and engage a similar latch 78 located at the trailing edge of the cart located immediately upstream in the assembled stack. The latch 78 is coupled to a release arm 80 having a roller 82. The release arm 80 and roller 82 are operable to rotate the latch 78 from the latching position shown in FIG. 9 to a release position, as will be described in detail below.

As illustrated in FIGS. 7 and 9, each of the carts 18 includes four drive roller assemblies 84. The drive roller assemblies 84 engage a rotating tube 86 of a spinning tube conveyor at different locations within the moving floor system 10. Each of the drive roller assemblies 84 includes four rollers 88 that are each rotatably mounted to a support bracket 90. The support bracket 90 includes a pair of angled plates that orient the rollers 88 at an angle of approximately 45°. The support bracket 90 is mounted to a mounting plate 92 by a pair of springs 94. The springs 94 allow the support bracket 90 to move relative to the stationary mounting plate 92. In this manner, when the cart 18 is lowered onto the rotating tube 86, the support bracket 90 and rollers 88 can flex upward. In the embodiment shown in FIGS. 7 and 9, four separate drive roller assemblies 84 are incorporated into each of the individual carts 18. However, it is contemplated that the number and configuration of the drive roller assemblies 84 could vary depending upon system requirements.

Figure 5:
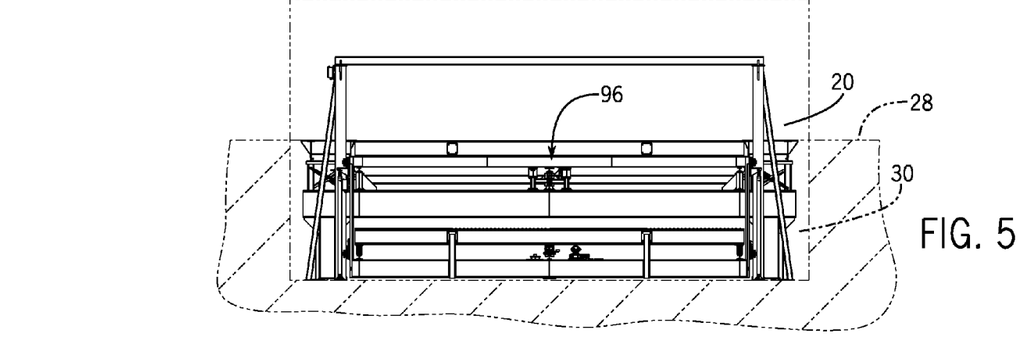
FIG. 5 is an end view taken along line 5-5 of FIG. 4.

Referring now to FIG. 5, an upper drive mechanism 96 is shown contained on the upper level of the moving floor system. The upper drive mechanism 96 operates to retrieve an individual cart from the upstream vertical lift conveyor 20 and move the cart into engagement with the moving stack of carts supported at the upper level. In addition, the upper drive mechanism 96 provides the motive force to move the entire stack of carts from the upstream end 14 to the downstream end 16, along with the supported work products.

Figure 6:
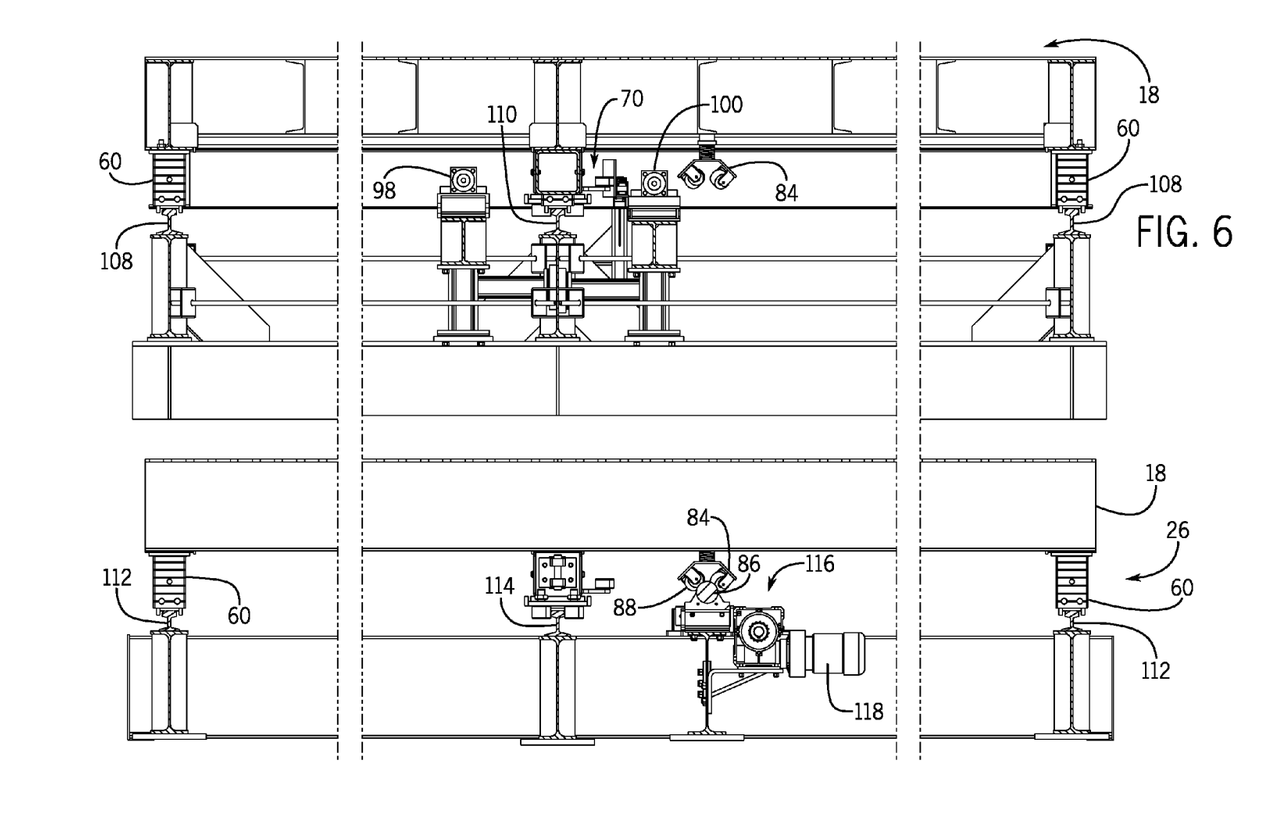
FIG. 6 is a section view taken along line 6-6 of FIG. 4.
Figure 13:
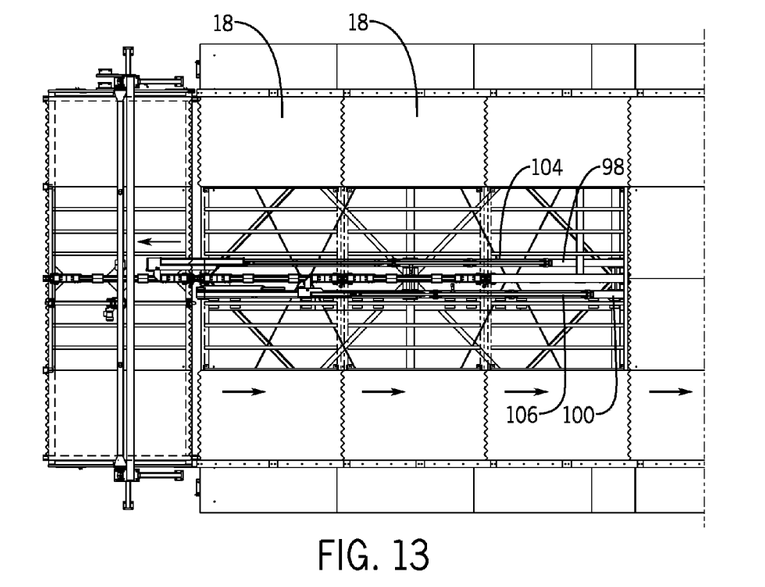
FIG. 13 is a partial top view showing the upper drive mechanism.

As illustrated in FIG. 6, the upper drive mechanism 96 includes a first pusher cylinder 98 and a second pusher cylinder 100. The first and second pusher cylinders 98, 100 are spaced from each other relative to the width of the moving floor system. The first pusher cylinder 98 controls the movement of an end hook 102, shown best in FIGS. 2 and 13. The end hook 102 is designed to engage one of the carts when the cart is positioned on the carriage 36 of the upstream vertical lift conveyor 20. The end hook 102 engages the cart to pull the cart from the carriage and into latching engagement with the most downstream cart 18. As illustrated in FIG. 13, the cylinder 98 includes an extendable cylinder rod 104 that includes the end hook 102. In the embodiment illustrated, the cylinder rod 104 is approximately 11' in length. When the cylinder 98 retracts the cylinder rod 104, the hydraulic pusher cylinder 98 causes the entire stack of carts 18 to move toward the downstream end.

The second pusher cylinder 100 includes a similar cylinder rod 106 and end hook.

During operation of the upper drive mechanism 96, the first pusher cylinder 98 pulls the cart from the carriage of the upstream vertical lift conveyor and into position in the stack. The pusher cylinder 98 continues to retract the cylinder rod until the cylinder rod reaches a desired location. At this location, the second pusher cylinder 100 begins to retract its cylinder rod 106, which engages the endmost cart and begins to take over movement of the entire stack. Once the second pusher cylinder 100 begins to pull the stack, the pusher cylinder 98 operates in the opposite direction to move the end hook 102 into position to receive the next cart from the upstream vertical lift conveyor 20. In this manner, the combination of the two pusher cylinders 98, 100 create the desired movement of the stack of carts from the upstream end to the downstream end. The pusher cylinders 98, 100 incorporate position and velocity feedback sensors, which are utilized by a servo control system to synchronize the cylinder pairs, control position, speed and acceleration and to coordinate the movement during the handoff of the stack movement from one of the pusher cylinders to the other.

Although the upper drive mechanism 96 is shown and described as including a pair of pusher cylinders, it is contemplated that the upper drive mechanism could be replaced by other types of conveyor systems. As an illustrative example, the upper drive mechanism 96 could include a lug conveyor, a chain conveyor or even individually and independently powered carts that could include power sources such as linear motors or geared drives. In such embodiments, the carts would still be moved in an assembled stack from the upstream end to the downstream end of the moving floor system.

Referring back to FIG. 6, the upper level 24 of the moving floor system includes upper support rails including a pair of side rails 108 and a center rail 110. The upper side rails 108 each receive the support wheels mounted within the support block 60 on each side of the cart 18. Likewise, the center rail 110 receives the support wheels contained within the latching assembly 70.

At the lower level 26, the moving floor system includes similar lower support rails including a pair of side rails 112 and a center rail 114. In the view shown in FIG. 6, a return drive mechanism 116 is further illustrated. The return drive mechanism 116 operates to cause each of the carts 18 to move along the lower support rails at the lower level 26 from the upstream end back to the downstream end for reintroduction into the stack of carts. The return drive mechanism 116 in the embodiment illustrated is a spinning tube conveyor, such as is currently available from Intellitrak. The spinning tube conveyor generally includes a drive motor 118 that operates through a series of mechanical components to rotate a solid tube 86. As illustrated in FIG. 6, the individual rollers 88 of each of the drive roller assemblies 84 contact the outer circumference of the rotating tube 86. Since the rollers 88 are positioned at an angle relative to vertical, the rotation of the tube 86 causes the rollers to pull the cart 18 along the length of the lower support rails. It is contemplated that multiple drive motors 118 are spaced along the length of the lower level to impart the required rotational movement of the solid tube 86.

Although a spinning tube conveyor is contemplated as being the return drive mechanism 116 in the embodiment illustrated, it should be understood that other types of conveyor systems, such as a lug conveyor, a chain conveyor or even individually and independently powered carts that could include power sources such as linear motors or geared drives. In such embodiments, the carts would still be moved in an assembled stack from the downstream end back to the upstream end of the moving floor system along the lower level.

Referring back to FIG. 4, the upper drive mechanism operates to move the stack of individual carts along the upper support rails of the upper level 24 at a working speed. In the embodiment illustrated, the working speed is contemplated at being approximately 3.25 fpm or less. As indicated, each of the carts thus takes approximately two hours to travel from the upstream end of the moving floor system to the downstream end. The return drive mechanism, which is used to move each of the individual carts along the lower support rails at the lower level from the upstream end to the downstream end, preferably operates to move each of the carts at a speed of approximately 45 fpm. At such speed, each of the carts makes the trip from the upstream end to the downstream end in approximately eight minutes. Since the return trip at the lower level is much less than the time needed to supply another cart to the end of the stack, only 2-3 carts are contained at the lower level 26 at any time. If the speed of the return drive mechanism is slowed, additional carts could be located at the lower level to insure that another cart is always ready to be placed at the end of the stack in the upper level. It is contemplated that the return speed will be at least five times the working speed to insure that carts are returned to the upstream end without the need to accumulate too many carts at the lower level.

The sequence of operation of the moving floor system will now be described with reference to FIGS. 10-17. Initially, when the back edge of the last cart in the stack clears a photo eye located at the upstream end at the upper level of the moving floor system, the upstream vertical lift conveyor 20 lowers the carriage 36 into alignment with the lower support rails 112. In this position, one of the carts 18 can now be moved onto the support rails contained on the carriage 36. To move the cart into position on the carriage 36, the return drive mechanism, which includes the rotating tube 86, operates to move the cart 18 from the position shown in FIG. 10 into the position shown in FIG. 11. Once in this position, sensors contained on the carriage indicate that the cart 18 is properly positioned. When properly positioned, the upstream vertical lift conveyor 20 is activated to move the carriage from the lower position shown in FIG. 11 to an upper position shown in FIG. 12. In this upper position, the carriage 36 is aligned with the upper support rails 108 contained at the upper level 24. The movement of the carriage is controlled by the extension of cylinder rods 120 within the lift cylinders 122.

Figure 12:
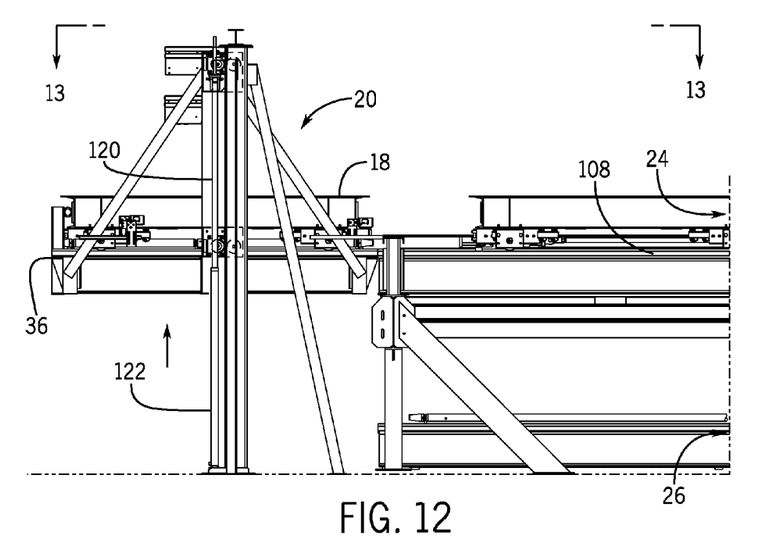
FIG. 12 is a side view showing the movement of the upstream vertical lift conveyor to align one of the carts with the upper support rails.

When the cart 18 is in the upper position shown in FIG. 12, the upper drive mechanism operates to extend the cylinder rod 104 from the first pusher cylinder 98, as illustrated in FIG. 13. When extended, the end hook 102 is positioned beneath the cart supported on the platform. The pusher cylinder 98 initially operates to pull the cart off of the carriage of the upstream vertical lift conveyor 20 at a higher rate of speed than the speed of the moving work surface. As the cart approaches the moving work surface, the pusher cylinder 98 slows down and synchronizes the cart with the moving work surface. Once the speed of the cart is synchronized with the moving work surface, the cart contacts the downstream end of the last cart in the stack and latches into position.

As illustrated in FIG. 2, a safety screen 124 is located at the upstream end 14 to prevent workers from entering into the position where the upstream vertical lift conveyor 20 loads the next cart into position for engagement with the end of the moving stack of carts that define the work surface 12. As shown in FIG. 3, a similar safety screen 124 is located at the downstream end 16 to prevent workers from entering into the area where the downstream vertical lift conveyor 22 is operating.

Figure 14A:
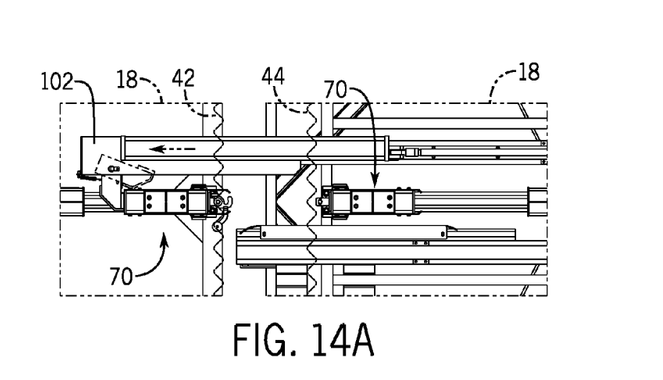
FIG. 14A illustrates the engagement of the pusher mechanism with one of the support carts.
Figure 14B:
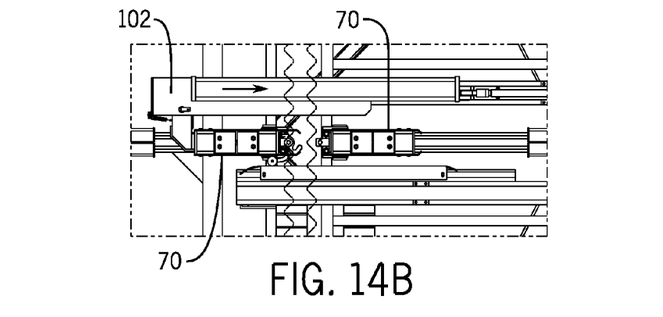

FIGS. 14A and 14B illustrate the latching of two carts together by the latching assemblies 70 contained at a leading edge 42 of one cart and the trailing edge 44 of another cart. FIGS. 14A and 14B further illustrate the end hook 102 of the pusher cylinder 98 engaging one of the carts to provide the required motive force to move the cart into engagement with the entire stack of carts along the upper level.

Figure 15:
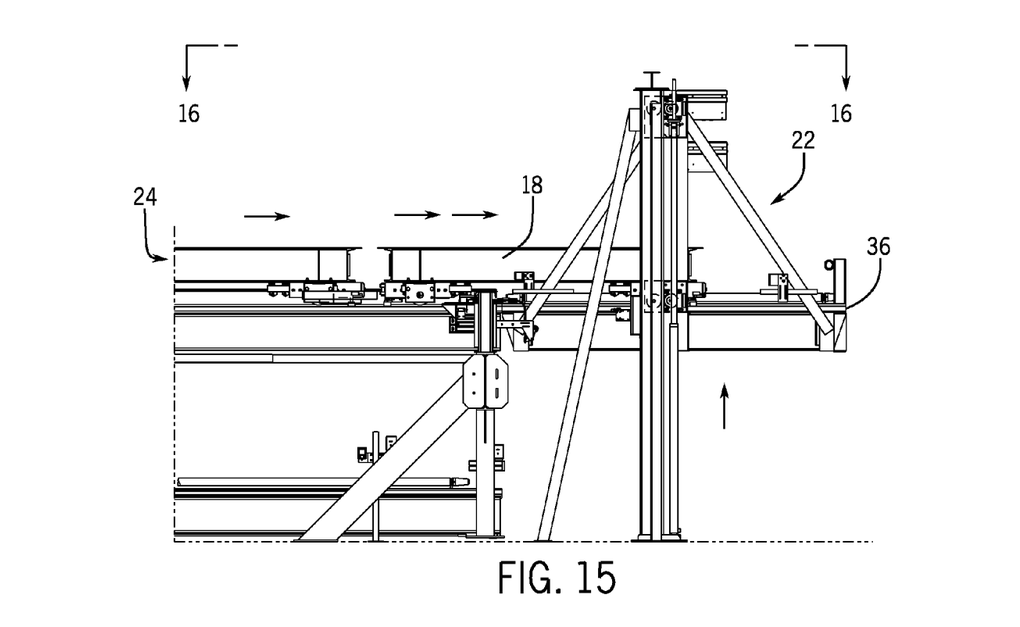
FIG. 15 is a side view showing the position of the support platform of the downstream vertical lift conveyor.
Figure 16:
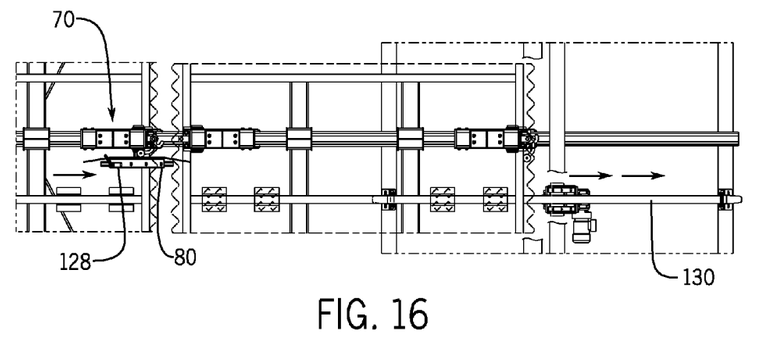
FIG. 16 illustrates the release of the latching mechanism between a pair of adjacent carts.

Referring now to FIG. 15, when the back edge of the last cart in the stack of carts clears an inactive floor warning zone light screen, the downstream vertical lift conveyor 22 moves the carriage 36 into an upper position in which the carriage is aligned with the upper support rails at the upper level 24. As illustrated in FIG. 16, a release mechanism 128 contacts the release arm 80 of the latch assembly 70, which allows the endmost cart to decouple from the stack. Once the endmost cart has decoupled, a drive mechanism on the carriage, which is shown by the tube 130, begins to operate to move the cart onto the carriage at a speed greater than the rate of movement of the work surface.

Figure 17:
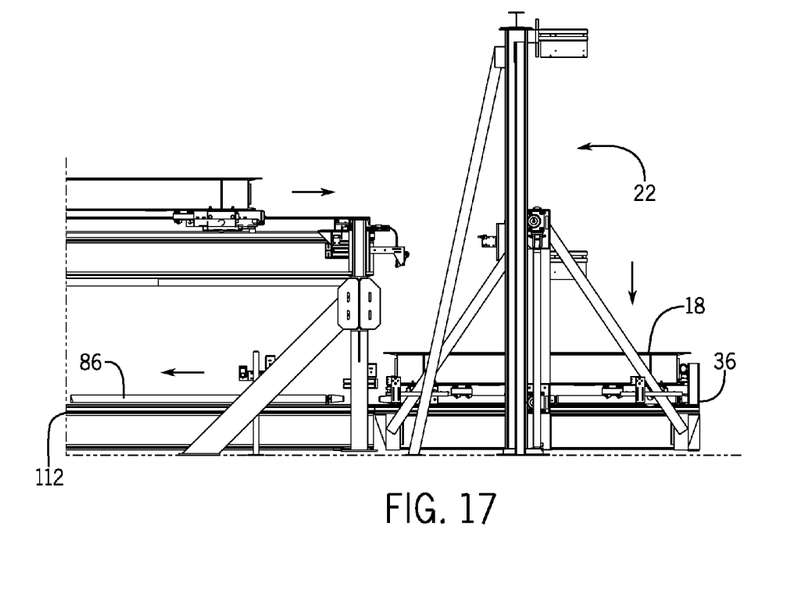
FIG. 17 illustrates the movement of the carriage support platform of the downstream vertical lift conveyor to move one of the carts into alignment with the lower support rails.

Once sensors indicate that the cart has been completely moved onto the carriage 36, the downstream vertical lift conveyor 22 retracts the lift cylinders causing the carriage 36 to move the lowered position shown in FIG. 17. In this lowered position, the carriage 36 is aligned with the lower support rails. In this position, the drive mechanism reverses operation, which cause the cart to move off of the carriage and into engagement with the return drive mechanism, which includes the rotating tube 86. Once the cart has been received by the return drive mechanism, the return drive mechanism operates to move the cart at the return speed from the upstream end to the downstream end of the moving floor system.

In addition to the operational sequence described above, the moving floor system of the present disclosure has been designed to include various different types of sensing arrangements to insure proper operation of the moving floor system. Specifically, adjacent carts contained within the stack of carts moving along the upper level are locked together as each individual cart is added to the stack. As described, the latching mechanism contained on each of the carts prevent separation of the carts during operation within the active zone of the moving floor system. The proper engagement of the latch mechanisms is electronically verified at an entry point at the upstream end prior to leaving the area defined by the upstream safety screen 124 shown in FIG. 2. Once the carts have been properly engaged, the carts remain engaged until they reach an inactive zone within the safety screen 124 shown at the downstream end 16 in FIG. 3. As described previously, the latching mechanisms are released within this zone such that a cart can be removed from the stack and returned to the lower level as described.

The two safety screens 124 shown at both the upstream end and the downstream end define a pair of inactive zones at both the upstream end and downstream end. These safety screens can include sensors that determine whether an object or a person is within either of the inactive zones. If a person or object is detected, an audible warning and a flashing light will be activated to alert personnel.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A moving floor system for moving articles along a floor from an upstream end of the system to a downstream end of the system, the system comprising:
    upper support rails located at an upper level that extend from the upstream end to the downstream end;
    lower support rails positioned beneath the upper support rails at a lower level, wherein the lower support rails extend from the upstream end to the downstream end;
    a plurality of carts movably supported along the upper support rails in an abutting relationship to each other to form a stack of carts that define a generally continuous work surface extending from the upstream end to the downstream end of the system;
    an upper drive mechanism operable to move the plurality of carts that form the stack of carts from the upstream end to the downstream end at a working speed;
    a downstream vertical lift conveyor positioned at the downstream end to receive each of the individual carts and operable to individually move each of the carts vertically from the upper level to the lower level;

a return drive mechanism operable to move each of the carts along the lower support rails from the downstream end to the upstream end at a return speed greater than the working speed; and an upstream vertical lift conveyor positioned at the upstream end to receive each of the individual carts and operable to individually move each of the carts vertically from the lower level to the upper level.

2. The system of claim 1 wherein the return speed is at least five times the working speed.

3. The system of claim 1 wherein both the upstream vertical lift conveyor and the downstream vertical lift conveyor include a carriage sized to receive one of the carts and movable vertically between a lower positioned aligned with the lower support rails and an upper position aligned with the upper support rails.

4. The system of claim 1 wherein the lower support rails are positioned within a pit located beneath the floor level.

5. The system of claim 1 wherein the upper drive mechanism includes a first pusher and a second pusher each operable to push the stack of carts along the upper support rails.

6. The system of claim 5 wherein the first pusher engages one of the carts to remove the cart from the carriage of the upstream vertical lift conveyor and the second pusher engages the plurality of carts to move the carts from the upstream end to the downstream end.

7. The system of claim 1 wherein each of the carts includes a latch to secure the cart to another cart in the stack of carts.

8. The system of claim 1 wherein the return drive mechanism engages each of the carts individually.

9. The system of claim 8 wherein the return drive mechanism is a rotating tube that engages rollers on the cart to move the cart along the lower support rails.

10. The system of claim 1 further comprising a discharge drive operable to separate one of the carts from the stack of carts for receipt on the downstream lift conveyor.

11. A moving floor system having a work surface moving from an upstream end to a downstream end, the system comprising:

upper support rails located at an upper level that extend from the upstream end to the downstream end;

lower support rails located at a lower level below the upper level, the pair of lower support rails extending from the upstream end to the downstream end;

a plurality of carts positioned in an abutting relationship to each other to create a stack of carts, each of the carts including a top surface, wherein the top surfaces of the stack of carts define the work surface;

an upper drive mechanism operable to move the plurality of carts that form the stack of carts from the upstream end to the downstream end;

a downstream vertical lift conveyor positioned at the downstream end to receive each of the individual carts and operable to move each of the carts individually from the upper level to the lower level;

a return drive operable to move each of the carts individually along the lower support rails from the downstream end to the upstream end; and an upstream vertical lift conveyor positioned at the upstream end to receive each of the individual carts and operable to move each of the carts individually from the lower level to the upper level.

12. The system of claim 11 wherein both the upstream lift conveyor and the downstream lift conveyor include a carriage sized to receive one of the carts and movable vertically between a lower position aligned with the lower support rails and an upper position aligned with the upper support rails.

13. The system of claim 11 wherein the upper drive mechanism includes a first member that engages one of the carts to remove the cart from the carriage of the upstream lift conveyor and a second member that pushes the stack of carts along the upper support rails.

14. The system of claim 11 wherein the return drive mechanism engage each of the carts individually.

15. The system of claim 14 wherein the return drive mechanism is a rotating tube that engages rollers on the cart to move the cart along the lower support rails.

* * * * *

UNITED STATES PATENT AND TRADEMARK OFFICE
CERTIFICATE OF CORRECTION

PATENT NO. : 9,598,242 B2
APPLICATION NO. : 14/606312
DATED : March 21, 2017
INVENTOR(S) : Webster et al.

It is certified that error appears in the above-identified patent and that said Letters Patent is hereby corrected as shown below:

On the Title Page

Item (73), Please insert --Pflow Industries, Inc.--, a Corporation located in --Milwaukee, WI--, as the Assignee.

Signed and Sealed this
Seventh Day of May, 2019

Andrei Iancu
*Director of the United States Patent and Trademark Office*